United States Patent [19]

Petersen

[11] Patent Number: 5,076,665

[45] Date of Patent: Dec. 31, 1991

[54] COMPUTER SCREEN MONITOR OPTIC RELIEF DEVICE

[75] Inventor: William L. Petersen, Laguna Niguel, Calif.

[73] Assignee: Robert C. Mardian, Jr., Dana Point, Calif. ; a part interest

[21] Appl. No.: 450,613

[22] Filed: Dec. 13, 1989

[51] Int. Cl.⁵ .......................... G02B 7/02; G02B 27/02
[52] U.S. Cl. ..................................... 359/809; 351/175; 359/811; 359/601; 359/831
[58] Field of Search ........... 350/286, 245, 144, 276 R, 350/452, 146, 143; 358/252; 351/175, 158, 203

[56] References Cited

U.S. PATENT DOCUMENTS

| | | | |
|---|---|---|---|
| 3,883,225 | 5/1975 | Rehm | 351/158 |
| 4,253,737 | 3/1981 | Thomsen et al. | 350/276 R |
| 4,529,268 | 7/1985 | Brown | 350/276 R |
| 4,577,928 | 3/1986 | Brown | 350/276 R |
| 4,712,870 | 12/1987 | Robinson et al. | 350/245 |
| 4,717,239 | 1/1988 | Steenblik | 350/144 |

Primary Examiner—Bruce Y. Arnold
Assistant Examiner—James Phan
Attorney, Agent, or Firm—Fulwider, Patton, Lee & Utecht

[57] ABSTRACT

An adjustable Pd lens frame carries a pair of prism lenses is adjustably positioned to a normal stationary position with respect to a computer monitor screen. The lenses provide "base in" for each eye and plus optical power to reduce both accommodative demand and convergence demand.

2 Claims, 2 Drawing Sheets

U.S. Patent   Dec. 31, 1991   Sheet 1 of 2   5,076,665
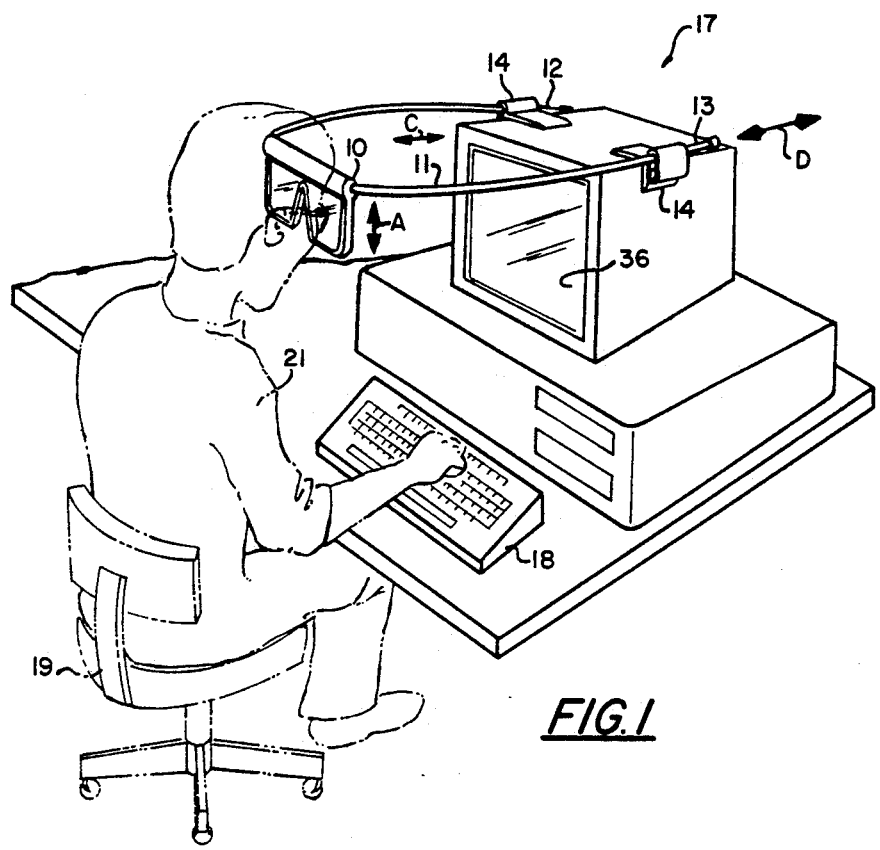
FIG. 1
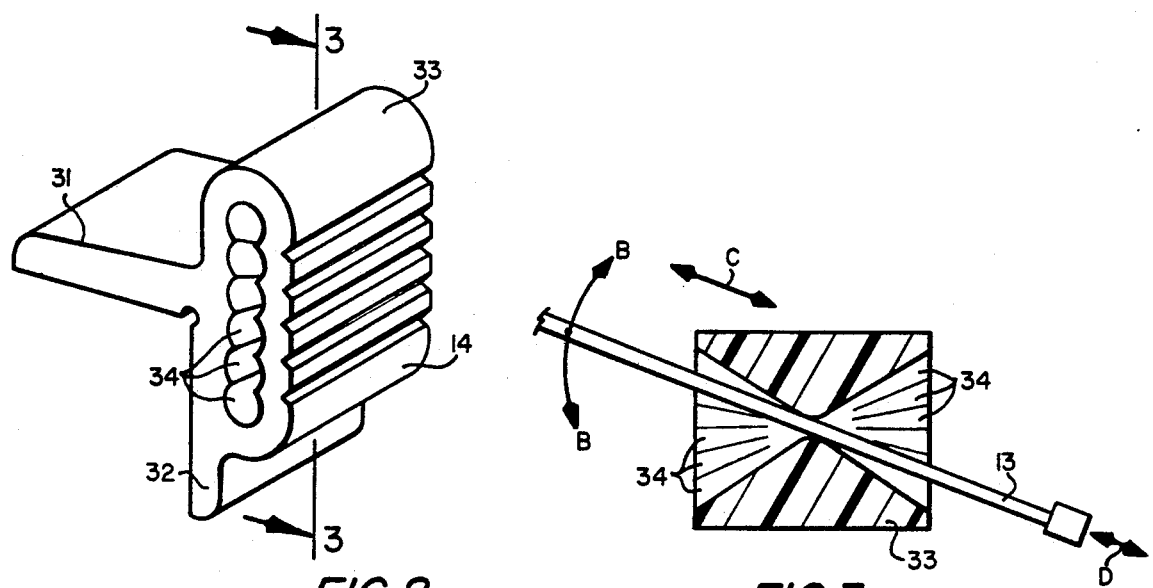
FIG. 2
FIG. 3

COMPUTER SCREEN MONITOR OPTIC RELIEF DEVICE

This invention relates to apparatus and methods for reducing computer operator eyestrain.

More particularly, the invention relates to an optical device for use at a computer work station to reduce eyestrain from viewing the monitor screen.

In still another aspect the invention relates to an optical device which can be readily semi-permanently attached by unskilled workers to a computer monitor.

In yet another respect the invention concerns an optical device which is useable by several different operators who may have occasion to operate the computer.

It is well known that operation of computers in which the operator is required to view a monitor screen for extended periods of time, while simultaneously operating a computer key board and periodically viewing various documents, tends to cause severe operator eyestrain. Various types of optical apparatus have been proposed to alleviate or reduce such eyestrain, by placing optical devices between the operator and the computer screen. For example U.S. Pat. No. 4,712,870 to Robinson describes a magnifying Fresnell lens which is interposed between the monitor and the operator to magnify the monitor screen image. Another such Fresnell magnifying lens and glare reduction system is disclosed in U.S. Pat. No. 4,577,928 to Brown. An anti-glare device comprising a filter screen for attachment to a CRT computer terminal display is disclosed in U.S. Pat. 4,253,737 to Thomsen. An adjustable lens holder for various magnifier, color tinting or anti-glare lenses is disclosed in the U.S. Pat. 4,529,268 to Brown.

Although image magnification and glare reduction devices may provide certain benefits, a principal cause of computer operator eyestrain is the requirement that the operators eyes must converge to focus on the images carried by the CRT computer monitor screen. If the degree of convergence required to bring the screen into focus can be reduced over extended periods of time, the resultant eyestrain is significantly reduced. The convergence required or, as more accurately described the "accommodative and convergence demands" required to focus on nearby images, can be reduced by viewing the images through prism lenses which make the images appear to be further away. However, such lenses cannot be conveniently adapted for continuous wear as normal eye glasses because they are comparatively heavy and cannot be worn during normal movements such as walking, etc.

It would be highly desireable to provide an optical device for use on semi-permanent location at a computer work station to reduce eyestrain from viewing the monitor screen.

It would also be advantageous to provide such a device which can be readily and conveniently, semi-permanently installed at a computer work station by persons of limited mechanical skill and which can be used by a plurality of different computer operators, one or more of which may also be wearing normal corrective eye glasses.

Similarly, it would be desirable to provide such an optical device which permits the computer operator to view the computer key board and documents from which information necessary for operating the computer must be ascertained, using the operators normal visual faculties, while using the device only to view the computer monitor screen.

Accordingly, the principal object of the invention is to provide an improved optical device for reducing eyestrain associated with viewing a computer monitor.

Yet another object of the invention is to provide methods for reducing computer operator eyestrain.

Still another object of the invention is to provide such devices and methods which permit the computer operator to utilize normal or corrected normal vision to perform other tasks at the computer work station, while using the devices and methods of the invention to reduce eyestrain associated with viewing the computer monitor.

Still another object of the invention is to provide such devices in the form of apparatus which can be quickly and conveniently, semi-permanently installed at a computer work station by persons of limited mechanical skill.

The other and more specific objects and advantages of the invention will be apparent to those skilled in the art from the following detailed description overall, taken in conjunction with the drawings, in which;

FIG. 1 is a perspective view of a conventional computer work station which is equipped with an optical device constructed in accordance with the presently preferred embodiment of the invention;

FIG. 2 is a perspective view of the bracket of the apparatus of FIG. 1 which is attached directly to the computer monitor cabinet;

FIG. 3 is a sectional view of the bracket of FIG. 2, taken along section line 3—3 thereof;

Figure 4:
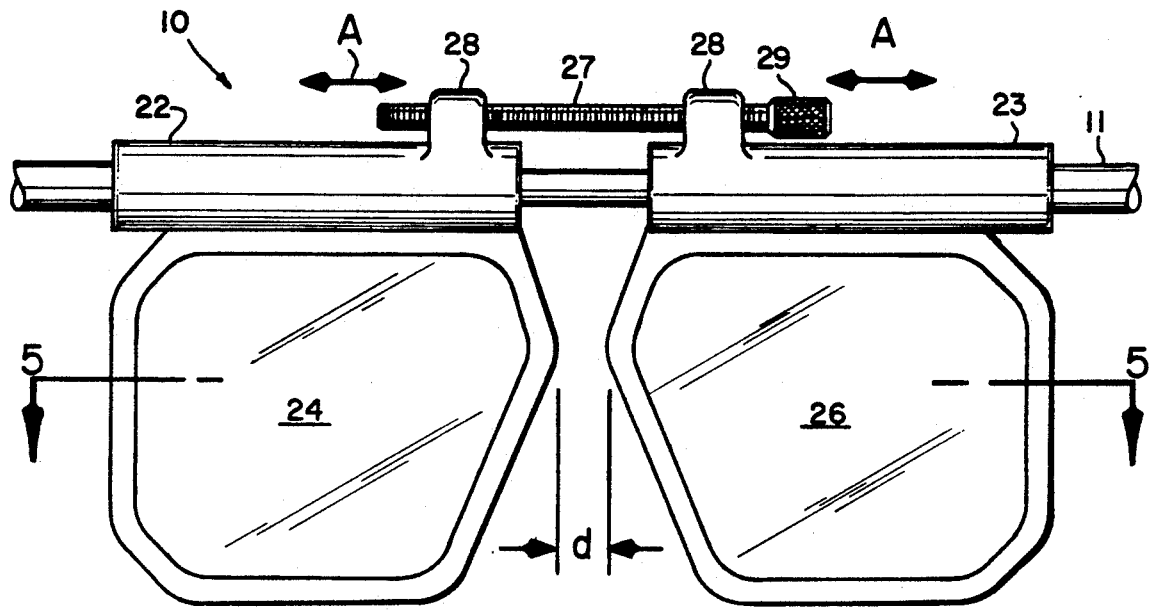
FIG. 4 is an elevation view of the lens and lens holder of the apparatus of FIG. 1.

Briefly, in accordance with the invention in one embodiment, I provide an optical device for use at a computer work station to reduce eyestrain caused by viewing the computer monitor screen. The device comprises an adjustable-Pd lens frame, a pair of prism lenses carried by the frame and a support for adjustably positioning the frame vertically and axially with respect to the monitor screen. The lenses are shaped and dimensioned to provide "base in" for each eye and a reduction in accommodative demand required to focus the eyes on the monitor screen.

In accordance with another embodiment of the invention I provide methods for reducing computer operator eyestrain arising from viewing a computer monitor screen. The method comprises inserting means between the operators eyes and the monitor screen for reducing the accommodation demand required for the operators eyes to focus on the monitor screen.

Turning now to the drawings, in which like reference characters identify the same apparatus in the several views, according to the presently preferred embodiment of the invention, a lens frame 10 is carried on a generally U-shaped support rod 11, the free ends 12 and 13 of which are secured by brackets 14 to the cabinet 16 of a computer monitor generally indicated by reference numeral 17. The monitor 17 is located at a convenient place in a computer work station, which also includes the computer keyboard 18 and a seat 19 for the computer operator 21.

The lens frame 10 comprises tubular slides 22 and 23 carrying lenses 24 and 26. The tubular members 22 and 23 are adapted to slide in directions indicated by the arrows A along the U-shaped rod 11. The members 22 and 23 may slide independently or may be attached by threaded rod 27 passing through internally threaded ears 28 carried on the sliding members 22 and 23. The distance d between the lenses 24 and 26 can be adjusted by turning the knurled knob 29.

The bracket 14, shown in larger scale in FIG. 2 is a plastic or rubber molding having a vertical flange 32 and a horizontal flange 31. The upper portion 33 of the molding (shown in cross section in FIG. 3). Internal grooves 24 formed in the holding 14 cooperates with the rod 13, received through the molding 14 to enable the computer operator to adjust the vertical angle of the rod 13 in the directions of the arrows B to adjustable position lens frame 10 vertically with respect to the monitor screen 36. The frame 10 can be adjusted axially of the monitor screen in the directions of the arrows C by sliding the rod ends 12 and 13 through the body portions 33 and the brackets 14 as indicated by arrows D.

Figure 5:
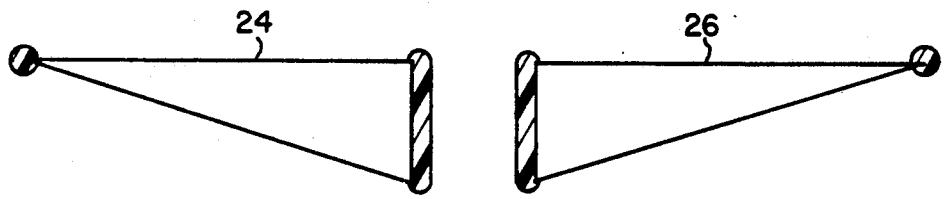
FIG. 5 is a sectional view of the lenses of FIG. 4, taken along section line 5—5 thereof, and depicting optical parameters of these lenses.
Figure 6:
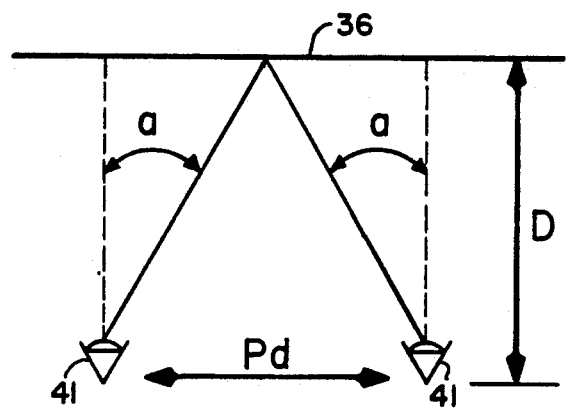
FIG. 6 is a diagram illustrating the optical principles which are utilized in the apparatus and methods of the invention.

As indicated in FIG. 5, the lenses 24 and 26 are "base in" prisms. Referring to FIG. 6, if D is the distance from the operators eyes 41 to the monitor screen 36 and Pd is the distance between the operators eyes 41 (both measured in mm), then the total convergence demand in prism diopters is equal to 100 (Pd)/D and the total accommodative demand in diopters equals 1/D (where D is measured in meters).

Upon the assumption that Pd=60 mm and D=400 mm, then the total convergence demand is 100 (60)/400=15 prism diopters and the total accommodative demand is 1.0/0.4=2.5 diopters.

To reduce the accommodative and convergence demands, by an amount effective to significantly reduce eye strain, I provide lenses 24 and 26 shaped to give 5 prism diopters base in for each eye and plus 0.75 to 1.25 diopter reduction of accommodative demand.

Other suitable base in prism diopters can be selected to provide other suitable reductions in accommodative demands, according to techniques which are well known in the art, having regard to this disclosure.

Having described my invention in such terms as to enable those skilled in the art to understand and practice it and having described the presently preferred embodiment thereof, I claim:

1. An optical device for use by any one of a plurality of operators at a computer work station to reduce eyestrain from viewing a monitor screen, while permitting the operator to view the keyboard and nearby objects with normal vision, said device comprising:
    (a) an adjustable-Pd lens frame;
    (b) a pair of prism lenses carried by said frame each of which provides a separate view of said screen to maintain stereopsis, said lenses being shaped and dimensioned to provide base in for each eye for reduction in convergence demand and plus optical power for reduction in accommodative demand; and
    (c) a support independent of the operator's body for adjustably positioning said frame vertically and axially with respect to said monitor screen to a normally fixed position relative to said screen.

2. A method for reducing eyestrain to any one of plurality of computer operators from viewing a computer monitor screen while permitting the operator to view the keyboard and nearby objects with normal vision, said method comprising inserting means between the operator's eyes and the monitor screen for
    (a) maintaining stereopsis and
    (b) reducing both the convergence demand and the accommodation demand required for the operator's eyes to focus on the monitor screen,
    said means being adjustable independently of the operator's body to a normally fixed position with respect to said screen and closer to the operator's eyes than to said screen.

* * * * *